(12) United States Patent
Sorimachi et al.

(10) Patent No.: US 12,017,178 B2
(45) Date of Patent: Jun. 25, 2024

(54) ABSORPTION SOLVENT REGENERATION DEVICE, CO2 RECOVERY DEVICE, AND METHOD FOR MODIFYING ABSORPTION SOLVENT REGENERATION DEVICE

(71) Applicant: MITSUBISHI HEAVY INDUSTRIES, LTD., Tokyo (JP)

(72) Inventors: Yoshiki Sorimachi, Kanagawa (JP); Takashi Kamijo, Kanagawa (JP); Shinya Kishimoto, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 437 days.

(21) Appl. No.: 17/439,221

(22) PCT Filed: Feb. 10, 2020

(86) PCT No.: PCT/JP2020/005126
§ 371 (c)(1),
(2) Date: Sep. 14, 2021

(87) PCT Pub. No.: WO2020/189093
PCT Pub. Date: Sep. 24, 2020

(65) Prior Publication Data
US 2022/0161184 A1 May 26, 2022

(30) Foreign Application Priority Data
Mar. 20, 2019 (JP) ................. 2019-052031

(51) Int. Cl.
*B01D 53/14* (2006.01)
*B01D 53/62* (2006.01)
*B01D 53/96* (2006.01)

(52) U.S. Cl.
CPC ..... *B01D 53/1425* (2013.01); *B01D 53/1475* (2013.01); *B01D 53/1493* (2013.01);
(Continued)

(58) Field of Classification Search
None
See application file for complete search history.

(56) References Cited

U.S. PATENT DOCUMENTS 8,357,344 B2 1/2013 Bouillon et al.
2007/0283813 A1 12/2007 Iijima et al.
(Continued)

FOREIGN PATENT DOCUMENTS

CN 202516335 U 11/2012
EP 2229997 A1 9/2010
(Continued)

OTHER PUBLICATIONS

The Examination Report dated Dec. 17, 2021, issued in counterpart IN Application No. 202117038927 (6 pages).
(Continued)

*Primary Examiner* — Jason M Greene
(74) *Attorney, Agent, or Firm* — Osha Bergman Watanabe & Burton LLP

(57) ABSTRACT

An absorption solvent regeneration device includes: a regenerator for regenerating an absorption solvent by separating $CO_2$ from the absorption solvent which has absorbed $CO_2$; a main rich solvent line for supplying the absorption solvent which has absorbed $CO_2$ to the regenerator; a regeneration reboiler for heating an absorption solvent extracted from the regenerator; a reboiler line configured to extract the absorption solvent stored in the regenerator and return the absorption solvent to the regenerator via the regeneration reboiler; a branch rich solvent line branching from the main rich solvent line and connected to a portion of the reboiler line downstream of the regeneration reboiler; and a heating part for heating the absorption solvent flowing through the branch rich solvent line, the heating part being disposed on the branch rich solvent line.

7 Claims, 2 Drawing Sheets

(52) U.S. Cl.
CPC ............. *B01D 53/62* (2013.01); *B01D 53/96* (2013.01); *B01D 2257/504* (2013.01)

(56) References Cited

U.S. PATENT DOCUMENTS

| | | | | |
|---|---|---|---|---|
| 2010/0319532 | A1* | 12/2010 | Iijima | B01D 53/1425 96/173 |
| 2014/0041523 | A1* | 2/2014 | Tsujiuchi | B01D 53/1425 96/218 |
| 2015/0027164 | A1 | 1/2015 | Ogawa et al. | |
| 2016/0001223 | A1* | 1/2016 | Okuno | B01D 53/1425 422/168 |
| 2018/0117524 | A1* | 5/2018 | Tsujiuchi | B01D 53/1425 |

FOREIGN PATENT DOCUMENTS

| | | |
|---|---|---|
| FR | 2202715 A1 | 5/1974 |
| JP | 2005-254212 A | 9/2005 |
| JP | 2011-240321 A | 12/2011 |
| JP | 2015-024398 A | 2/2015 |
| JP | 2016-048160 A | 4/2016 |
| RU | 138586 U1 | 3/2014 |
| SU | 1756725 A1 | 8/1992 |
| WO | 2014-024791 A1 | 2/2014 |

OTHER PUBLICATIONS

The Office Action dated Jun. 10, 2022, issued in counterpart RU application No. 2021127312 (20 pages).
On the Effect of Liquid Velocity On the Dynamics of a Straight Pipeline. Belov I.A., post-graduate student UDC 621.311.22.019. 32. State educational institution of higher vocational education "Ivanovo State Power Engineering University named after V.I. Lenin" (pp. 1-3). "Bulletin of ISPU", Issue 2, 2007. (3 pages).
The Extended European Search Report dated Apr. 11, 2022, issued to the corresponding European Application No. 20773271.0 (10 pages).

* cited by examiner

ABSORPTION SOLVENT REGENERATION DEVICE, CO2 RECOVERY DEVICE, AND METHOD FOR MODIFYING ABSORPTION SOLVENT REGENERATION DEVICE

TECHNICAL FIELD

The present disclosure relates to an absorption solvent regeneration device, a $CO_2$ recovery device, and a method for modifying an absorption solvent regeneration device.

BACKGROUND

As a method for recovering $CO_2$ in flue gas produced by combustion of fuel or the like, a method has been proposed in which the flue gas and a $CO_2$ absorption solvent are brought into gas-liquid contact to recover $CO_2$ in the flue gas.

For example, Patent Document 1 discloses a $CO_2$ recovery device including an absorber and a regenerator. In the absorber, a $CO_2$-containing gas and an absorption solvent are brought into contact such that $CO_2$ is absorbed by the absorption solvent to remove $CO_2$ from the gas. The absorption solvent (rich solvent) which has absorbed $CO_2$ in the absorber is introduced to the regenerator and then heated with steam in a regeneration reboiler to remove $CO_2$ from the absorption solvent. The absorption solvent (lean solution) thus regenerated is returned to the absorber to be reused as the $CO_2$ absorption solvent.

Further, Patent Document 1 describes that part of the absorption solvent (rich solvent) from the absorber to the regenerator is branched, and the branched absorption solvent is heated by residual heat of steam condensate from the regeneration reboiler and then introduced to the regenerator. By using the residual heat of steam condensate used in the regeneration reboiler to heat the absorption solvent, the steam consumption required for regeneration of the absorption solvent (i.e., steam consumption in the regeneration reboiler) is reduced.

CITATION LIST

Patent Literature

Patent Document 1: JP2005-254212A

SUMMARY

Problems to be Solved

The absorption solvent heated in the regeneration reboiler (reboiler) for regenerating the absorption solvent introduced to the regenerator is generally returned from the regeneration reboiler to the regenerator via a reboiler outlet line. Here, depending on the flow state of the absorption solvent in the reboiler outlet line, vibration may occur in a pipe that constitutes the reboiler outlet line.

In this regard, Patent Document 1 does not describe any countermeasures against vibration that may occur in the reboiler outlet line.

In view of the above, an object of at least one embodiment of the present invention is to provide an absorption solvent regeneration device, a $CO_2$ recovery device, and a method for modifying an absorption solvent regeneration device whereby it is possible to suppress vibration or the like of a pipe in the reboiler outlet line while reducing the consumption amount of a heating medium in the regeneration reboiler.

Solution to the Problems (1) An absorption solvent regeneration device according to at least one embodiment of the present invention comprises: a regenerator for regenerating an absorption solvent by separating $CO_2$ from the absorption solvent which has absorbed $CO_2$; a main rich solvent line for supplying the absorption solvent which has absorbed $CO_2$ to the regenerator; a regeneration reboiler for heating an absorption solvent extracted from the regenerator; a reboiler line configured to extract the absorption solvent stored in the regenerator and return the absorption solvent to the regenerator via the regeneration reboiler; a branch rich solvent line branching from the main rich solvent line and connected to a portion of the reboiler line downstream of the regeneration reboiler; and a heating part for heating the absorption solvent flowing through the branch rich solvent line, the heating part being disposed on the branch rich solvent line.

With the above configuration (1), the absorption solvent (rich solvent) branching from the main rich solvent line is first heated by the heating part disposed on the branch rich solvent line, and is then supplied to a portion (reboiler outlet line) of the reboiler line downstream of the regeneration reboiler (reboiler). As a result, compared to the case where the absorption solvent in the main rich solvent line is not branched, the amount of heat required to heat the absorption solvent in the regeneration reboiler can be reduced, i.e., the amount of the heating medium consumed in the regeneration reboiler can be reduced, and the piping vibration can be suppressed by adjusting the flow state in the reboiler outlet line.

Further, with the above configuration (1), since the branch rich solvent line is connected to the reboiler line, for example, compared to the case where the branch rich solvent line is connected to the regenerator to reduce the consumption amount of the heating medium in the regeneration reboiler, the cost of modifying the existing absorption solvent regeneration device can be reduced, or the construction period can be shortened.

(2) In some embodiments, in the above configuration (1), the regeneration reboiler is configured such that a flow of the absorption solvent discharged from the regeneration reboiler to the reboiler line is a two-phase flow.

When the flow of the absorption solvent discharged from the regeneration reboiler to the reboiler outlet line (reboiler line) is a two-phase flow, depending on the operating condition of the absorption solvent regeneration device, the flow state of the two-phase flow may be a bulk flow (slug flow) including a bulk liquid phase portion. In this case, due to the bulk flow, vibration or the like may occur in a pipe that constitutes the reboiler outlet line. In this regard, with the above configuration (2), even in the operating condition where the two-phase flow is a bulk flow in the reboiler outlet line, since the absorption solvent is supplied to the reboiler outlet line from the branch rich solvent line connected to the reboiler outlet line, the flow rate in the reboiler outlet line can be increased. Therefore, the flow state of the two-phase flow in the reboiler outlet line is more likely to be an annular flow, which can suppress vibration of the pipe caused by the bulk flow in the reboiler outlet line.

(3) In some embodiments, in the above configuration (1) or (2), the absorption solvent regeneration device further comprises a steam supply line for supplying steam for heating the absorption solvent to the regeneration reboiler. The heating part includes a heat exchanger configured to exchange heat between condensed water of steam after heating the absorption solvent in the regeneration reboiler and the absorption solvent flowing through the branch rich solvent line.

With the above configuration (3), since the absorption solvent in the branch rich solvent line is heated by using excess heat of steam used in heating the absorption solvent in the regeneration reboiler, compared to the case where the absorption solvent in the main rich solvent line is not branched, the steam consumption amount in the regeneration reboiler can be reduced, and the operating efficiency of the absorption solvent regeneration device can be improved as a whole.

(4) In some embodiments, in any one of the above configurations (1) to (3), the absorption solvent regeneration device further comprises a valve for regulating a flow rate of the absorption solvent in the branch rich solvent line, the valve being disposed in the branch rich solvent line.

With the above configuration (4), by regulating the flow rate of the absorption solvent in the branch rich solvent line with the valve disposed in the branch rich solvent line, the flow rate in the reboiler outlet line connected with the branch rich solvent line can be regulated. This makes it easier to regulate the flow state in the reboiler outlet line.

(5) A $CO_2$ recovery device according to at least one embodiment of the present invention comprises: an absorber configured to cause $CO_2$ in a flue gas to be absorbed by an absorption solvent by bringing the flue gas containing $CO_2$ and the absorption solvent into contact; and the absorption solvent regeneration device described in any one of the above (1) to (4). The main rich solvent line is configured to supply the absorption solvent which has absorbed $CO_2$ in the absorber to the regenerator.

With the above configuration (5), the absorption solvent (rich solvent) branching from the main rich solvent line is first heated by the heating part disposed on the branch rich solvent line, and is then supplied to a portion (reboiler outlet line) of the reboiler line downstream of the regeneration reboiler. As a result, compared to the case where the absorption solvent in the main rich solvent line is not branched, the amount of heat required to heat the absorption solvent in the regeneration reboiler can be reduced, i.e., the amount of the heating medium consumed in the regeneration reboiler can be reduced, and the piping vibration can be suppressed by adjusting the flow state in the reboiler outlet line.

Further, with the above configuration (5), since the branch rich solvent line is connected to the reboiler line, for example, compared to the case where the branch rich solvent line is connected to the regenerator to reduce the consumption amount of the heating medium in the regeneration reboiler, the cost of modifying the existing absorption solvent regeneration device can be reduced, or the construction period can be shortened.

(6) A method for modifying an absorption solvent regeneration device according to at least one embodiment of the present invention is a method for modifying an absorption solvent regeneration device including: a regenerator for regenerating an absorption solvent by separating $CO_2$ from the absorption solvent which has absorbed $CO_2$; a main rich solvent line for supplying the absorption solvent which has absorbed $CO_2$ to the regenerator; a regeneration reboiler for heating an absorption solvent extracted from the regenerator; and a reboiler line configured to extract the absorption solvent stored in the regenerator and return the absorption solvent to the regenerator via the regeneration reboiler, and the method comprises a step of additionally installing a branch rich solvent line branching from the main rich solvent line and connected to a portion of the reboiler line downstream of the regeneration reboiler, and a heating part for heating the absorption solvent flowing through the branch rich solvent line, the heating part being disposed in the branch rich solvent line.

With the above modifying method (6), by connecting the branch rich solvent line to the reboiler outlet line (reboiler line), the absorption solvent regeneration device (1) can be obtained. Therefore, unlike the case described in Patent Document 1, for example, where the branch rich solvent line is connected to the regenerator in order to reduce the consumption amount of the heating medium (e.g., steam) in the regeneration reboiler, no construction of the regenerator is required. Thus, for obtaining the absorption solvent regeneration device that can reduce the consumption amount of the heating medium in the regeneration reboiler, the cost of modifying the existing absorption solvent regeneration device can be reduced, or the construction period can be shortened.

Further, in the absorption solvent regeneration device obtained with the modifying method (6), the absorption solvent (rich solvent) branching from the main rich solvent line is supplied to a portion (reboiler outlet line) of the reboiler line downstream of the regeneration reboiler. Accordingly, vibration of the pipe can be suppressed by adjusting the flow state in the reboiler outlet line.

(7) In some embodiments, the above method (6) further comprises a step of installing, in the branch rich solvent line, a valve for regulating a flow rate of the absorption solvent in the branch rich solvent line.

When the valve is installed in the branch rich solvent line with the above method (7), the flow rate of the absorption solvent in the branch rich solvent line can be regulated by appropriately operating the valve. This enables the regulation of the flow rate in the reboiler outlet line connected to the branch rich solvent line, making it easier to regulate the flow state in the reboiler outlet line.

Advantageous Effects

At least one embodiment of the present invention provides an absorption solvent regeneration device, a $CO_2$ recovery device, and a method for modifying an absorption solvent regeneration device whereby it is possible to suppress vibration or the like of a pipe in the reboiler outlet line while reducing the consumption amount of a heating medium in the regeneration reboiler.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
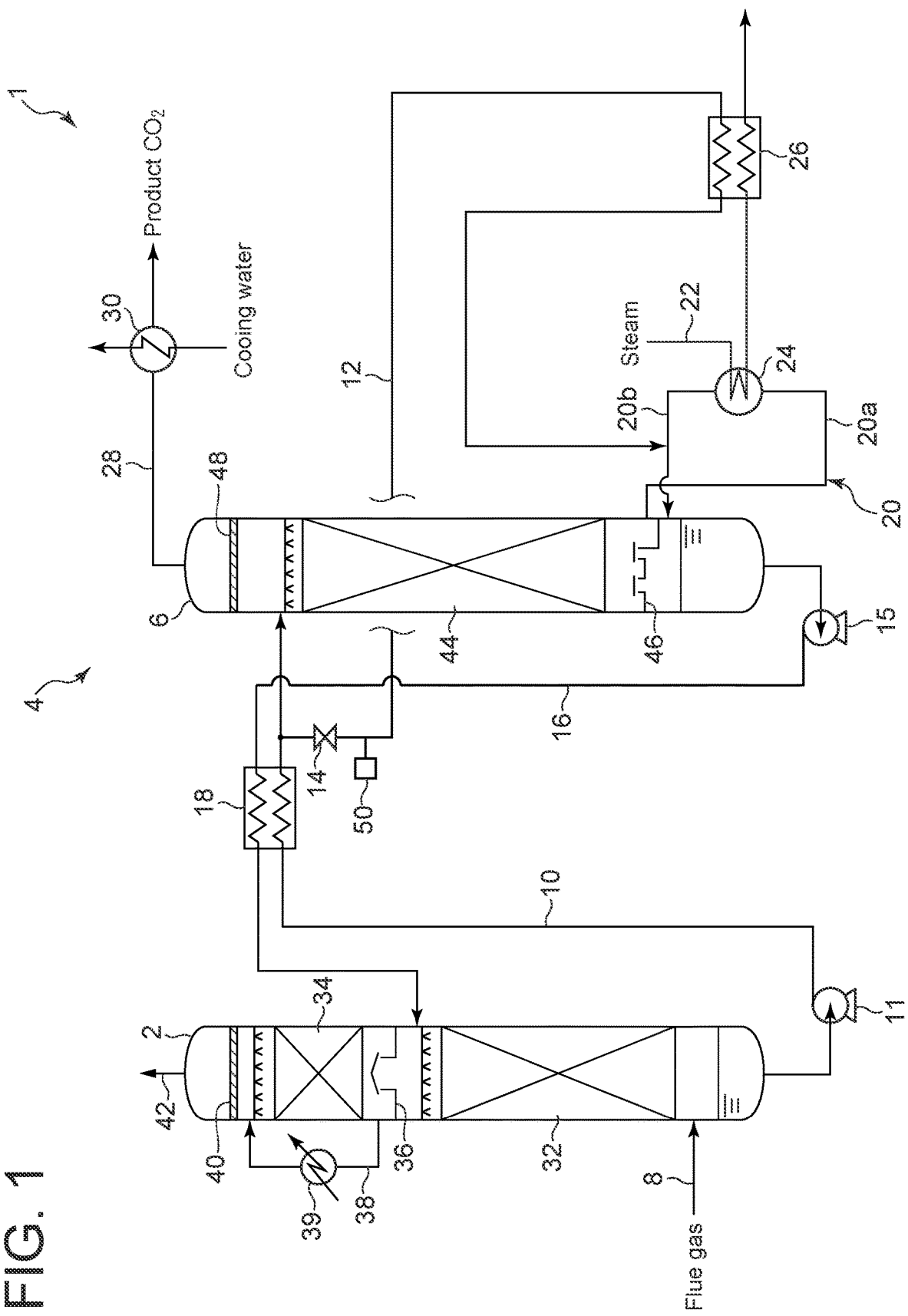
FIG. 1 is a schematic diagram of a $CO_2$ recovery device including an absorption solvent regeneration device according to an embodiment.

FIG. 1 is a schematic diagram of a $CO_2$ recovery device including an absorption solvent regeneration device according to an embodiment of the present invention. The $CO_2$ recovery device 1 shown in FIG. 1 is a device for recovering $CO_2$ from flue gas discharged from a power generation facility, a plant, or the like. As illustrated in the drawing, the $CO_2$ recovery device 1 includes an absorber 2 for causing $CO_2$ in the flue gas to be absorbed in an absorption solvent, and an absorption solvent regeneration device 4 including a regenerator 6 for regenerating the absorption solvent which has absorbed $CO_2$ in the absorber 2. The absorption solvent regeneration device 4 includes a main rich solvent line 10 disposed between the absorber 2 and the regenerator 6, and a regeneration reboiler (reboiler) 24 for heating the absorption solvent stored in the regenerator 6.

Flue gas from a plant or the like is introduced to the absorber 2 via a flue gas introduction line 8. Flue gas from a plant or the like may be introduced to the absorber 2 after pre-treatment such as sulfur removal and cooling.

The absorber 2 includes an absorbing section 32 for absorbing $CO_2$ gas in the flue gas, a washing section 34 for washing the flue gas from which the $CO_2$ gas has been removed, and a demister 40, disposed above the washing section 34, for removing mist in the flue gas.

The absorbing section 32 is supplied with the absorption solvent (lean solvent) stored in the tower bottom portion of the regenerator 6 via a lean solvent line 16. The lean solvent line 16 is provided with a lean solvent pump 17 for pumping the lean solvent. The flue gas entering the absorber 2 through the flue gas introduction line 8 flows upward in the absorber 2 from the bottom portion side of the absorber 2, flows into the absorbing section 32, and comes into countercurrent contact in the absorbing section 32 with the absorption solvent (lean solvent) supplied from above the absorbing section 32. As a result, $CO_2$ in the flue gas is absorbed by the absorption solvent, and $CO_2$ is separated and removed from the flue gas. The absorbing section 32 may be formed by a packed layer packed with a packing material made of any material.

The absorption solvent is a liquid containing a $CO_2$ absorption agent. Although the type of $CO_2$ absorption agent is not limited, amines such as alkanolamines represented by monoethanolamine and diethanolamine, and various alkaline solutions other than amines such as sodium hydroxide, potassium hydroxide, and calcium hydroxide can be used as the $CO_2$ absorption agent.

The absorption solvent which has absorbed $CO_2$ from the flue gas in the absorbing section 32 descends to the bottom portion of the absorber 2 and is stored in the tower bottom portion. The absorption solvent stored in the bottom portion of the absorber 2 is a rich solvent having a higher $CO_2$ concentration than the absorption solvent (lean solvent) stored in the bottom portion of the regenerator 6.

The washing section 34 is configured to wash the flue gas in order to recover the $CO_2$ absorption agent contained in the flue gas after removal of $CO_2$. The washing section 34 is supplied with washing water from a circulation line 38 from above. When the flue gas after removal of $CO_2$ comes into contact with the washing water in the washing section 34, the $CO_2$ recovery agent contained in the flue gas is dissolved in the washing water and thus can be recovered. Below the washing section 34, a chimney tray 36 is disposed. The washing water which has descended from the washing section 34 is circulated through the circulation line 38 by a circulation pump 39 and is again supplied to the washing section 34 from above the washing section 34.

The flue gas from which the $CO_2$ absorption agent has been removed passes through the demister 40 disposed above the washing section 34, where the mist in the flue gas is captured. The flue gas deprived of mist is discharged outside from the tower top portion 42 of the absorber 2.

The absorption solvent (rich solvent) stored in the bottom portion of the absorber 2 is supplied from the absorber 2 to the regenerator 6 via a main rich solvent line 10. The main rich solvent line 10 is provided with a rich solvent pump 11 for pumping the rich solvent from the bottom portion of the absorber 2 to the regenerator 6. Further, a heat exchanger 18 is disposed in the main rich solvent line 10 to exchange heat between the rich solvent flowing in the main rich solvent line 10 and the absorption solvent (lean solvent) flowing in a lean solvent line 16, which will be described later. By heating the rich solvent through heat exchange with the lean solvent of relatively high temperature in the heat exchanger 18, it is possible to promote the regeneration of the absorption solvent in the regenerator 6 described below.

The regenerator 6 includes a release section 44 for releasing $CO_2$ gas from the rich solvent, and a chimney tray 46 disposed below the release section 44. The release section 44 has a packing material and is supplied with the absorption solvent (rich solvent) from the main rich solvent line 10 from above. In the release section 44, the rich solvent supplied as described above is heated by saturated steam supplied from a regeneration reboiler 24 to release the $CO_2$ gas, so that the absorption solvent (lean solvent) with relatively low $CO_2$ content is obtained. The lean solvent that drops from the release section 44 is received by the chimney tray 46.

The $CO_2$ gas released from the rich solvent in the release section 44 rises upward in the regenerator 6 toward the top of the release section 44, and after mist in the gas is captured by a demister 48, the gas is discharged from the regenerator 6 through a recovery line 28 connected to the top portion of the regenerator 6. The recovery line 28 is provided with a condenser 30. The condenser 30 is configured to cool the $CO_2$ gas discharged from the regenerator 6 by heat exchange with cooling water to condense moisture contained in the $CO_2$ gas. The $CO_2$ gas thus separated from moisture is recovered as a product. A gas-liquid separator (not shown) may be disposed downstream of the condenser 30 in the recovery line 28 to separate the $CO_2$ gas from the condensate.

The regenerator 6 is connected to a reboiler line 20 with a regeneration reboiler 24. The reboiler line 20 is configured to extract the absorption solvent stored in the regenerator 6 and return it to the regenerator 6 via the regeneration reboiler 24. The regeneration reboiler 24 is configured to heat the absorption solvent (lean solvent) introduced through the reboiler line 20, by heat exchange with a heating medium. In the exemplary embodiment shown in FIG. 1, the regeneration reboiler 24 is supplied with steam as the heating medium via a steam supply line 22.

The lean solvent received by the chimney tray 46 in the regenerator 6 is extracted from the regenerator 6 via a reboiler inlet line 20a of the reboiler line 20 and is introduced to the regeneration reboiler 24. In the regeneration reboiler 24, the lean solvent from the reboiler inlet line 20a is heated by heat exchange with steam from the steam supply line 22.

The regeneration reboiler 24 may be configured such that the flow of the absorption solvent (lean solvent) discharged from the regeneration reboiler 24 to the reboiler outlet line 20b (reboiler line 20) is a two-phase flow. Specifically, the lean solvent heated in the regeneration reboiler 24 may at least partially change its phase to saturated vapor and may be discharged to the reboiler outlet line 20b of the reboiler line 20 in a gas-liquid multiphase state. The lean solvent in a gas-liquid multiphase state is returned to the regenerator 6 via the reboiler outlet line 20b, more specifically, it is introduced to the bottom portion (below the chimney tray 46) of the regenerator 6 via the reboiler outlet line 20b.

The saturated steam introduced to the bottom portion of the regenerator 6 via the reboiler outlet line 20b raises in the regenerator 6 through the chimney tray 46, and is used to heat the rich solvent in the release section 44 to release $CO_2$ contained in the rich solvent, as described above.

On the other hand, the lean solvent introduced to the bottom portion of the regenerator 6 via the reboiler outlet line 20b (i.e., lean solvent that does not change phase in the regeneration reboiler 24) is stored in the bottom portion of the regenerator 6. This lean solvent is extracted from the bottom portion of the regenerator 6 via the lean solvent line 16 and is supplied to the absorbing section 32 of the absorber 2 by the lean solvent pump 17 disposed in the lean solvent line 16. The lean solvent thus returned to the absorber 2 is reused as the absorption solvent for absorbing $CO_2$ contained in the flue gas in the absorbing section 32. The lean solvent flowing in the lean solvent line 16 is cooled at the heat exchanger 18 by heat exchange with the rich solvent flowing in the main rich solvent line 10.

The absorption solvent regeneration device 4 further includes a branch rich solvent line 12 branching from the main rich solvent line 10 and a heating part 26 disposed on the branch rich solvent line 12.

The branch rich solvent line 12 is connected to the reboiler outlet line 20b which is a portion of the reboiler line 20 downstream of the regeneration reboiler 24. In the exemplary embodiment shown in FIG. 1, the branch rich solvent line 12 is provided with a valve 14. The valve 14 can regulate the flow rate of the absorption solvent in the branch rich solvent line 12 (the flow rate of the rich solvent branching from the main rich solvent line 10 to the branch rich solvent line 12).

The branch rich solvent line 12 may be provided with a flow rate meter 50 for measuring the flow rate of the absorption solvent in the branch rich solvent line 12. Further, the opening degree of the valve 14 may be controlled based on the measurement result of the flow rate meter 50, and the flow rate of the absorption solvent in the branch rich solvent line 12 may be regulated according to the opening degree control.

The heating part 26 is configured to heat the absorption solvent (lean solvent) flowing through the branch rich solvent line 12. In the exemplary embodiment shown in FIG. 1, the heating part 26 is a heat exchanger configured to heat the absorption solvent (lean solvent) flowing through the branch rich solvent line 12 by heat exchange with condensed water of steam after heating the absorption solvent in the regeneration reboiler 24.

As described above, in the above-described absorption solvent regeneration device 4, the absorption solvent (rich solvent) branching from the main rich solvent line 10 is first heated by the heating part 26 disposed on the branch rich solvent line 12, and is then supplied to a portion (reboiler outlet line 20b) of the reboiler line 20 downstream of the reboiler. As a result, compared to the case where the absorption solvent (rich) in the main rich solvent line 10 is supplied to the regenerator 6 without branching, the amount of heat required to heat the absorption solvent in the regeneration reboiler 24 can be reduced, i.e., the amount of steam consumed in the regeneration reboiler 24 can be reduced.

In the reboiler outlet line 20b, depending on the flow state of the fluid including the absorption solvent (lean solvent), vibration may occur in a pipe that constitutes the reboiler outlet line 20b. For example, when the flow from the regeneration reboiler 24 is a two-phase flow of gas-liquid mixture, this flow may become a bulk flow (slug flow) or a ring flow (annular flow) depending on the ratio of gas and liquid components, flow rate, and other factors. When the flow in the pipe is a bulk flow, the pipe is likely to vibrate. In contrast, when the flow in the pipe is an annular flow, the pipe is less likely to vibrate.

In this regard, in the above-described absorption solvent regeneration device 4, the absorption solvent (rich solvent) branching from the main rich solvent line 10 is supplied to the reboiler outlet line 20b. As a result, even when the absorption solvent regeneration device is in the operating condition where the flow in the reboiler outlet line 20b is generally a bulk flow, since the absorption solvent is supplied to the reboiler outlet line 20b from the branch rich solvent line 12, the flow rate in the reboiler outlet line 20b can be increased. Therefore, the flow in the reboiler outlet line 20b is more likely to be an annular flow, so that vibration of the pipe can be suppressed by adjusting the flow state in the reboiler outlet line 20b.

Further, in the above-described absorption solvent regeneration device 4, since the branch rich solvent line 12 is connected to the reboiler line 20, for example, compared to the case where the branch rich solvent line 12 is connected to the absorber 2 to reduce the consumption amount of the heating medium (e.g., steam) in the regeneration reboiler 24, the cost of modifying the existing absorption solvent regeneration device 4 can be reduced, or the construction period can be shortened.

Further, when the valve 14 is disposed in the branch rich solvent line 12, the flow rate of the absorption solvent in the branch rich solvent line 12 can be regulated by the valve 14. As a result, the flux in the reboiler outlet line 20b connected with the branch rich solvent line 12 can be easily regulated, and the flow state in the reboiler outlet line 20b can be easily regulated.

Further, by regulating the opening degree of the valve 14 based on the measurement result of the flow rate meter 50 disposed in the branch rich solvent line 12, the flow rate of the absorption solvent in the branch rich solvent line 12 can be regulated more appropriately. As a result, the flux in the reboiler outlet line 20b connected with the branch rich solvent line 12 can be easily regulated, and the flow state in the reboiler outlet line 20b can be easily regulated.

Further, in the above-described embodiment, the heating part 26 heats the absorption solvent of the branch rich solvent line 12 by heat exchange with condensed water of steam after heating the absorption solvent in the regeneration reboiler 24. In other words, since the absorption solvent in the branch rich solvent line 12 is heated by using excess heat of steam used in heating the absorption solvent in the regeneration reboiler 24, compared to the case where the absorption solvent in the main rich solvent line 10 is not branched (i.e., when the branch rich solvent line 12 is not provided), the steam consumption amount in the regeneration reboiler 24 can be reduced, and the operating efficiency of the absorption solvent regeneration device 4 can be improved as a whole.

As shown in FIG. 1, the branch rich solvent line 12 may be branched from a portion of the main rich solvent line 10 downstream of the heat exchanger 18. In this case, since the rich solvent heated in the heat exchanger 18 flows through the branch rich solvent line 12, it is possible to reduce the amount of heat exchange in the heating part 26.

Figure 2:
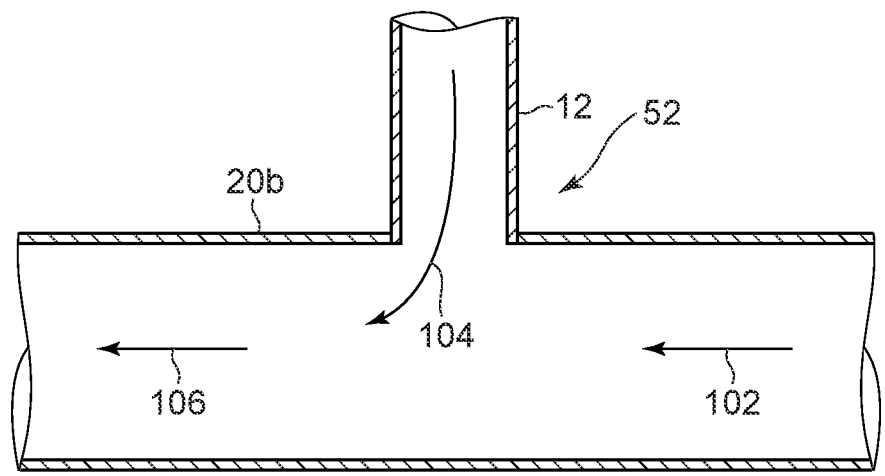
FIG. 2 is a schematic diagram showing a connection portion between a branch rich solvent line and a reboiler outlet line in an absorption solvent regeneration device according to an embodiment.
Figure 3:
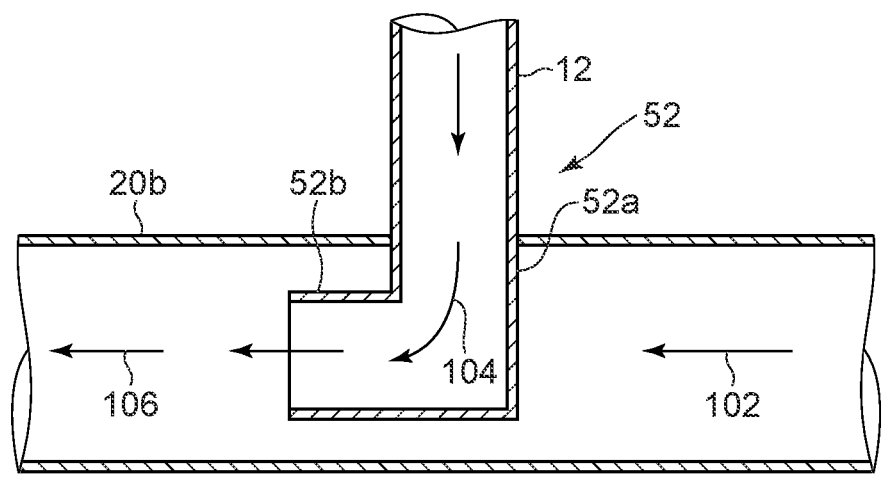
FIG. 3 is a schematic diagram showing a connection portion between a branch rich solvent line and a reboiler outlet line in an absorption solvent regeneration device according to an embodiment.

FIGS. 2 and 3 are each a schematic diagram showing a connection portion between the branch rich solvent line 12 and the reboiler outlet line 20b (reboiler line 20) in the absorption solvent regeneration device 4 according to an embodiment.

As shown in FIGS. 2 and 3, the branch rich solvent line 12 has a connection portion 52 with the reboiler outlet line 20b. The rich solvent 104 from the branch rich solvent line 12 enters the reboiler outlet line 20b through the connection portion 52 and joins the lean solvent 102 from the regeneration reboiler 24 in the reboiler outlet line 20b. The mixed flow of the rich solvent 104 and the lean solvent 102 formed by this confluence is returned to the regenerator 6 via the reboiler outlet line 20b.

In the exemplary embodiment shown in FIG. 2, at the connection portion 52, one end of the pipe constituting the branch rich solvent line 12 is connected to the wall surface of the pipe constituting the reboiler outlet line 20b.

In the exemplary embodiment shown in FIG. 3, the connection portion 52 of the branch rich solvent line 12 has a penetrating portion 52a penetrating the pipe constituting the reboiler outlet line 20b, and a turning portion 52b connected to the penetrating portion 52a. The center axis of the turning portion 52b is oblique to the center axis of the penetrating portion 52a (the inclination angle is about 90 degrees in FIG. 2), Further, the turning portion 52b is disposed to extend along the center axis of the reboiler outlet line 20b. With this configuration, the rich solvent 104 of the branch rich solvent line 12 is turned at the connection portion 52 and smoothly joins the lean solvent 102 flowing through the reboiler outlet line 20b.

The above-described absorption solvent regeneration device 4 may be newly constructed or formed by modification work to an existing absorption solvent regeneration device. Hereinafter, the method for modifying the absorption solvent regeneration device according to some embodiments will be described.

In the case of obtaining the absorption solvent regeneration device 4 by modification work to the existing device, the absorption solvent regeneration device 4 may be obtained by modification work including additional installation of the branch rich solvent line 12 and the heating part 26 to the existing device.

In some embodiments, the object of the modification work is an absorption solvent regeneration device (existing device) that includes the regenerator 6 for regenerating the absorption solvent, the main rich solvent line 10 for supplying the absorption solvent to the regenerator 6, the regeneration reboiler 24, and the reboiler line 20 (see FIG. 1). In this case, the absorption solvent regeneration device 4 according to an embodiment can be obtained by connecting one end of the pipe constituting the branch rich solvent line 12 to the main rich solvent line 10 and connecting the other end of the pipe to the reboiler outlet line 20b to additionally install the branch rich solvent line 12, and installing the heating part 26 on the branch rich solvent line 12, Further, in some embodiments, the valve 14 may be installed in the branch rich solvent line 12.

With the above-described modifying method, by connecting the branch rich solvent line 12 to the reboiler outlet line 20b (reboiler line 20), the absorption solvent regeneration device 4 can be obtained. Therefore, unlike the case where the branch rich solvent line is connected to the regenerator 6 in order to reduce the consumption amount of the heating medium (e.g., steam) in the regeneration reboiler, no construction of the regenerator 6 is required. Thus, the cost of modifying the existing absorption solvent regeneration device can be reduced, or the construction period can be shortened.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 $CO_2$ recovery device
2 Absorber
4 Absorption solvent regeneration device
6 Regenerator
8 Flue gas introduction line
10 Main rich solvent line
11 Rich solvent pump
12 Branch rich solvent line
14 Valve
16 Lean solvent line
17 Lean solvent pump
18 Heat exchanger
20 Reboiler line
20a Reboiler inlet line
20b Reboiler outlet line
22 Steam supply line
24 Regeneration reboiler (Reboiler)
26 Heating part
28 Recovery line
30 Condenser
32 Absorbing section
34 Washing section
36 Chimney tray
38 Circulation line
39 Circulation pump
40 Demister
42 Tower top portion
44 Release section
46 Chimney tray
48 Demister
50 Flow rate meter 52 Connection portion
52a Penetrating portion
52b Turning portion
54 Chimney tray
102 Lean solvent
104 Rich solvent

The invention claimed is:

1. An absorption solvent regeneration device, comprising:
a regenerator for regenerating an absorption solvent by separating $CO_2$ from the absorption solvent which has absorbed $CO_2$;
a main rich solvent line for supplying the absorption solvent which has absorbed $CO_2$ to the regenerator;
a regeneration reboiler for heating an absorption solvent extracted from the regenerator;
a reboiler line configured to extract the absorption solvent stored in the regenerator and return the absorption solvent to the regenerator via the regeneration reboiler;
a branch rich solvent line branching from the main rich solvent line for supplying a portion of the absorption solvent to a portion of the reboiler line downstream of the regeneration reboiler; and
a heating part for heating the absorption solvent flowing through the branch rich solvent line, the heating part being disposed on the branch rich solvent line.

2. The absorption solvent regeneration device according to claim 1,
wherein the regeneration reboiler is configured such that a flow of the absorption solvent discharged from the regeneration reboiler to the reboiler line is a two-phase flow.

3. The absorption solvent regeneration device according to claim 1, further comprising a steam supply line for supplying steam for heating the absorption solvent to the regeneration reboiler,
wherein the heating part includes a heat exchanger configured to exchange heat between condensed water of steam after heating the absorption solvent in the regeneration reboiler and the absorption solvent flowing through the branch rich solvent line.

4. The absorption solvent regeneration device according to claim 1, further comprising a valve for regulating a flow rate of the absorption solvent in the branch rich solvent line, the valve being disposed in the branch rich solvent line.

5. A $CO_2$ recovery device, comprising:
an absorber configured to cause $CO_2$ in a flue gas to be absorbed by an absorption solvent by bringing the flue gas containing $CO_2$ and the absorption solvent into contact; and
the absorption solvent regeneration device according to claim 1,
wherein the main rich solvent line is configured to supply the absorption solvent which has absorbed $CO_2$ in the absorber to the regenerator.

6. A method for modifying an absorption solvent regeneration device, the absorption solvent regeneration device including:
a regenerator for regenerating an absorption solvent by separating $CO_2$ from the absorption solvent which has absorbed $CO_2$;
a main rich solvent line for supplying the absorption solvent which has absorbed $CO_2$ to the regenerator;
a regeneration reboiler for heating an absorption solvent extracted from the regenerator; and
a reboiler line configured to extract the absorption solvent stored in the regenerator and return the absorption solvent to the regenerator via the regeneration reboiler;
the method comprising a step of additionally installing a branch rich solvent line branching from the main rich solvent line for supplying a portion of the absorption solvent to a portion of the reboiler line downstream of the regeneration reboiler, and a heating part for heating the absorption solvent flowing through the branch rich solvent line, the heating part being disposed in the branch rich solvent line.

7. The method for modifying an absorption solvent regeneration device according to claim 6, further comprising a step of installing, in the branch rich solvent line, a valve for regulating a flow rate of the absorption solvent in the branch rich solvent line.

* * * * *